(12) United States Patent
Kaneko

(10) Patent No.: US 6,229,910 B1
(45) Date of Patent: May 8, 2001

(54) IMAGE ANALYZING APPARATUS

(75) Inventor: Takashi Kaneko, Kanagawa-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/017,797

(22) Filed: Feb. 3, 1998

(30) Foreign Application Priority Data

Jun. 2, 1997 (JP) .................................................. 9-038367

(51) Int. Cl.[7] ......................................................... G06K 9/00
(52) U.S. Cl. ................................................................ 382/128
(58) Field of Search .................................. 382/128, 131, 382/132, 254, 283, 284, 294

(56) References Cited

U.S. PATENT DOCUMENTS

| | | | | |
|---|---|---|---|---|
| 4,777,597 | * | 10/1988 | Shirashi et al. ........................ | 250/583 |
| 4,962,539 | * | 10/1990 | Takeo et al. .......................... | 382/180 |
| 5,028,793 |  | 7/1991 | Lindmayer et al. ............... | 250/484.1 |
| 5,570,432 | * | 10/1996 | Kojima ................................. | 382/254 |
| 5,619,592 | * | 4/1997 | Bloomberg et al. ................. | 382/175 |
| 5,668,897 | * | 9/1997 | Stolfo ................................... | 382/283 |
| 5,729,704 | * | 3/1998 | Stone et al. .......................... | 345/346 |

FOREIGN PATENT DOCUMENTS

| | | | |
|---|---|---|---|
| 2 246 197 | 1/1992 | (GB) .............................. | G01N/21/76 |
| 55-12429 | 1/1980 | (JP) .................................. | G01T/1/10 |
| 55-116340 | 9/1980 | (JP) .................................. | A61B/6/00 |
| 55-163472 | 12/1980 | (JP) .................................. | G01T/1/29 |
| 56-11395 | 2/1981 | (JP) .................................. | G21K/4/00 |
| 56-104645 | 8/1981 | (JP) .................................. | A61B/6/00 |
| 59-15843 | 1/1984 | (JP) .................................. | G01N/23/20 |
| 61-93538 | 5/1986 | (JP) .................................. | H01J/37/20 |
| 61-51738 | 11/1986 | (JP) .................................. | G01N/33/18 |
| 1-60782 | 12/1989 | (JP) .................................. | G01N/33/58 |
| 1-60784 | 12/1989 | (JP) .................................. | G01N/33/60 |
| 4-3952 | 1/1992 | (JP) .................................. | C12N/15/00 |

* cited by examiner

*Primary Examiner*—Andrew W. Johns
*Assistant Examiner*—Shervin Nakhjavan
(74) *Attorney, Agent, or Firm*—Sughrue, Mion, Zinn, Macpeak & Seas, PLLC

(57) ABSTRACT

An image analyzing apparatus includes an image data memory for storing image data and a graphic data memory for storing graphic data, the image analyzing apparatus being adapted to displaying an image on a screen of a CRT based on image data stored in the image data memory, define a plurality of regions of interest in the image using graphic data stored in the graphic data memory and effect quantitative analysis, the image analyzing apparatus further comprising a calculation effecting section for producing quantitative data based on image data corresponding to the plurality of regions of interest, adding and/or subtracting the thus produced quantitative data and display the results of calculation on the screen of the CRT. According to the thus constituted image analyzing apparatus, it is possible to define an image region which cannot be defined by a single figure in an image reproduced based on image data as a region of interest and effecting quantitative analysis thereon.

20 Claims, 9 Drawing Sheets

FIG. 7

Result Table

| Make ROI | New |

| | Show |

|    | PSL    | AREA  |
|----|--------|-------|
| A1 | 2422   | 67    |
| A2 | 2162   | 61    |
| A3 | 1474   | 47    |
| A4 | 1875   | 61    |
| A5 | 1986   | 67    |
| A6 | 381856 | 16978 |

FIG. 9

Result Table

[Make ROI] [New]
[Show]

|    | PSL    | AREA  |
|----|--------|-------|
| A1 | 2422   | 67    |
| A2 | 2162   | 61    |
| A3 | 1474   | 47    |
| A4 | 1875   | 61    |
| A5 | 1986   | 67    |
| A6 | 381856 | 16978 |

Group Table

[Append Member]

|       | PSL    | AREA  |
|-------|--------|-------|
| Make1 | 371937 | 16675 |

[Remove Member]

Make ROI Table

| Name  | PSL    | AREA  |
|-------|--------|-------|
| Make1 | 371937 | 16675 |

[Delete]

Additional Group

[Append Member]

|       | PSL    | AREA  |
|-------|--------|-------|
| Total | 381856 | 16978 |
| A6    | 381856 | 16978 |

[Remove Member]

Subtract Group

[Append Member]

|       | PSL  | AREA |
|-------|------|------|
| Total | 9919 | 303  |
| A1    | 2422 | 67   |
| A2    | 2162 | 61   |
| A3    | 1474 | 47   |
| A4    | 1875 | 61   |
| A5    | 1986 | 67   |

[Remove Member]

IMAGE ANALYZING APPARATUS

BACKGROUND OF THE INVENTION

The present invention relates to an image analyzing apparatus and, particularly, to such an apparatus capable of defining an image region which cannot be defined by a single figure in an image reproduced based on image data as a region of interest and effecting quantitative analysis thereon.

DESCRIPTION OF THE PRIOR ART

There is known a radiation diagnosis system comprising the steps of employing, as a detecting material for the radiation, a stimulable phosphor which can absorb and store the energy of radiation upon being irradiated therewith and release a stimulated emission whose amount is proportional to that of the received radiation upon being stimulated with an electromagnetic wave having a specific wavelength range, storing and recording the energy of radiation transmitted through an object in the stimulable phosphor contained in a stimulable phosphor layer formed on a stimulable phosphor sheet, scanning the stimulable phosphor layer with an electromagnetic wave to excite the stimulable phosphor, photoelectrically detecting the stimulated emission released from the stimulable phosphor to produce digital image signals, effecting image processing on the obtained digital image signals, and reproducing an image on displaying means such as a CRT or the like or a photographic film (see for example, Japanese Patent Application Laid Open Nos. 55-12429, 55-116340, 55-163472, 56-11395, 56-104645 and the like).

There is also known an autoradiography system comprising the steps of employing a similar stimulable phosphor as a detecting material for the radiation, introducing a radioactively labeled substance into an organism, using the organism or a part of the tissue of the organism as a specimen, placing the specimen and a stimulable phosphor sheet formed with a stimulable phosphor layer together in layers for a certain period of time, storing and recording radiation energy in a stimulable phosphor contained in the stimulable phosphor layer, scanning the stimulable phosphor layer with an electromagnetic wave to excite the stimulable phosphor, photoelectrically detecting the stimulated emission released from the stimulable phosphor to produce digital image signals, effecting image processing on the obtained digital image signals, and reproducing an image on displaying means such as a CRT or the like or a photographic film (see for example, Japanese Patent Publication No. 1-60784, Japanese Patent Publication No. 1-60782, Japanese Patent Publication No. 4-3952 and the like).

There is further known a chemiluminescent process comprising the steps of employing, as a detecting material for light, a stimulable phosphor which can absorb and store the energy of light upon being irradiated therewith and release a stimulated emission whose amount is proportional to that of the received light upon being stimulated with an electromagnetic wave having a specific wavelength range, selectively labeling a fixed high molecular substance such as a protein or a nucleic acid sequence with a labeling substance which generates chemiluminescent emission when it contacts a chemiluminescent substance, contacting the high molecular substance selectively labeled with the labeling substance and the chemiluminescent substance, storing and recording the chemiluminescent emission in the wavelength of visible light generated by the contact of the chemiluminescent substance and the labeling substance in the stimulable phosphor contained in a stimulable phosphor layer formed on a stimulable phosphor sheet, scanning the stimulable phosphor layer with an electromagnetic wave to excite the stimulable phosphor, photoelectrically detecting the stimulated emission released from the stimulable phosphor to produce digital image signals, effecting image processing on the obtained digital image signals, and reproducing an image on displaying means such as a CRT or the like or a photographic film (see for example, U.S. Pat. No. 5,028,793, UK Patent Application 2,246,197 A and the like).

There are further known an electron microscope detecting system and a radiographic diffraction image detecting system comprising the steps of employing, as a detecting material for an electron beam or radiation, a stimulable phosphor which can absorb and store the energy of an electron beam or radiation upon being irradiated therewith and release a stimulated emission whose amount is proportional to that of the received electron beam or radiation upon being stimulated with an electromagnetic wave having a specific wavelength range, irradiating a metal or nonmetal specimen with an electron beam and effecting elemental analysis, composition analysis or structural analysis of the specimen by detecting a diffraction image or a transmission image, or irradiating the tissue of an organism with an electron beam and detecting an image of the tissue of the organism, or irradiating a specimen with radiation, detecting a radiographic diffraction image and effecting structural analysis of the specimen (see for example, Japanese Patent Application Laid Open No. 61-51738, Japanese Patent Application Laid Open No. 61-93538, Japanese Patent Application Laid Open No. 59-15843 and the like).

Unlike the system using a photographic film, according to these systems using the stimulable phosphor as a detecting material for an image, development which is chemical processing, becomes unnecessary. Further, it is possible reproduce a desired image by effecting image processing on the obtained image data and effect quantitative analysis using a computer. Use of a stimulable phosphor in these processes is therefore advantageous.

On the other hand, a fluorescence detecting system using a fluorescent substance as a labeling substance instead of a radioactively labeled substance in the autoradiography system is known. According to this system, it is possible to study a genetic sequence, the expression level of a gene and the metabolism, absorption, excretion path and state of a substance introduced into a test mouse and to effect the separation or identification of protein or the estimation of the molecular weight or properties of protein or the like. For example, this system can perform a process including the steps of distributing a plurality of DNA fragments on a gel support by means of electrophoresis after a fluorescent dye was added to a solution containing a plurality of DNA fragments to be distributed or distributing a plurality of DNA fragments on a gel support containing fluorescent dye or dipping a gel support on which a plurality of DNA fragments have been distributed by means of electrophoresis in a solution containing fluorescent dye, thereby labeling the electrophoresis-distributed DNA fragments, exciting the fluorescent dye by a stimulating ray to cause it to release a fluorescent light, detecting the released fluorescent light to produce an image and detecting the distribution of the DNA on the gel support. This system also performs a process including the steps of distributing a plurality of DNA fragments on a gel support by means of electrophoresis, denaturing the DNA, transferring at least a part of the denatured DNA fragments onto a transfer support such as a nitrocellulose support by the Southern-blotting method, hybridizing a probe prepared by labeling target DNA and DNA or RNA complementary thereto with the denatured DNA fragments, thereby selectively labeling only the DNA fragments complementary to the probe DNA or probe RNA, exciting the fluorescent dye by a stimulating ray to cause it to release a fluorescent light, detecting the released fluorescent light to produce an image and detecting the distribution of the target DNA on the transfer support. This system can further perform a process including the steps of preparing a DNA probe complementary to DNA containing a target gene labeled by a labeling substance, hybridizing it with DNA on a transfer support, combining an enzyme with the complementary DNA labeled by a labeling substance, causing the enzyme to contact a fluorescent substrate, transforming the fluorescent substrate to a fluorescent substance having a property to release fluorescent light, exciting the thus produced fluorescent substance by a stimulating ray to release fluorescent light, detecting the fluorescent light to produce an image and detecting the distribution of the target DNA on the transfer support. This fluorescence detecting system is advantageous in that a genetic sequence or the like can be easily detected without using a radioactive substance.

An image analyzing apparatus which is adapted for reproducing a visible image on a display means such as a CRT based on image data in the form of electrical signals and analyzing it is constituted so as to define a region included in an image displayed on the display means such as a CRT and to be analyzed as a region of interest using a figure and analyze it.

However, when, for example, an autoradiographic image for studying a genetic sequence, the expression level of a gene and the metabolism, absorption, excretion path and state of a substance introduced into a test mouse is obtained using a stimulable phosphor sheet by slicing the test mouse when a predetermined time period has passed after a drug labeled with a radioactively labeling substance was introduced thereinto, since the test mouse was sliced, a single organ thereof is sometimes displayed on a display means such as a CRT so as to be divided to a plurality of spaced image regions. In this case, it is often required to define the plurality of spaced image regions as a single region of interest and effect quantitative analysis thereon. However, a plurality of spaced image regions in an image cannot be defined as a single region of interest in a conventional image analyzing apparatus and it is therefore required to analyze the respective regions of interest and manually effect calculation based on the results of analysis to effect quantitative analysis on the organ. This is extremely troublesome.

Further, in an autoradiographic image obtained by two-dimensionally distributing protein on a TLC plate in thin layer chromatography (TLC) of protein, a plurality high density spot image regions are two-dimensionally distributed and images of a radioactively labeling substance are formed in addition to the plurality of spot image regions. Therefore, it is often required to define the image regions other than the plurality of spot image regions as a single region of interest for quantitative analysis. However, the image regions other than the plurality of spot image regions cannot be defined as a single region of interest in a conventional image analyzing apparatus and it is therefore required to define the plurality of spot image regions as a single region of interest, quantitatively analyze it and effect quantitative analysis on the image regions other than the plurality of spot image regions by manual calculation based on the results of analysis of the whole image and the plurality of spot image regions. This is also extremely troublesome.

SUMMARY OF THE INVENTION

It is therefore an object of the present invention to provide an image analyzing apparatus capable of defining an image region which cannot be defined by a single figure in an image reproduced based on image data as a region of interest and effecting quantitative analysis thereon.

The above and other objects of the present invention can be accomplished by an image analyzing apparatus comprising image data storing means for storing image data and graphic data storing means for storing graphic data, the image analyzing apparatus being adapted to displaying an image on a display means based on image data stored in the image data storing means, define a plurality of regions of interest in the image using graphic data stored in the graphic data storing means and effect quantitative analysis, the image analyzing apparatus further comprising calculation effecting means for producing quantitative data based on image data corresponding to the plurality of regions of interest, adding and/or subtracting the thus produced quantitative data and display the results of calculation on the display means.

In a preferred aspect of the present invention, the image analyzing apparatus further comprises interest region quantitative data storing means for storing the quantitative data of the regions of interest obtained by the addition and/or subtraction effected by the calculation effecting means and data regarding how the quantitative data of the regions of interest were obtained as interest region data.

In a further preferred aspect of the present invention, the image analyzing apparatus further comprises table data producing means for producing table data based on the results of calculation effected by the calculation effecting means and displaying at least one table on the display means.

In a further preferred aspect of the present invention, the image data are produced using a stimulable phosphor sheet formed with a stimulable layer containing a stimulable phosphor.

In a further preferred aspect of the present invention, the image data are constituted by image data selected from a group consisting of radiation image data of an object, autoradiographic image data, radiographic diffraction image data, electron microscopic image data, chemiluminescent image data and fluorescent image data produced by a fluorescent detecting system.

In the present invention, the stimulable phosphor employed for producing radiation image data of an object, autoradiographic image data, radiographic diffraction image data and electron microscopic image data may be of any type insofar as it can store radiation energy or electron beam energy and can be stimulated by an electromagnetic wave to release the radiation energy or electron beam energy stored therein in the form of light. However, a stimulable phosphor which can be stimulated by light having a visible light wavelength is preferably employed. More specifically, preferably employed stimulable phosphors include alkaline earth metal fluorohalide phosphors $(Ba_{1-x},M^{2+}_x)FX:yA$ (where $M^{2+}$ is at least one alkaline earth metal selected from the group consisting of Mg, Ca, Sr, Zn and Cd; X is at least one halogen selected from the group consisting of Cl, Br and I, A is at least one element selected from the group consisting of Eu, Tb, Ce, Tm, Dy, Pr, He, Nd, Yb and Er; x is equal to or greater than 0 and equal to or less than 0.6 and y is equal to or greater than 0 and equal to or less than 0.2.) disclosed in U.S. Pat. No. 4,239,968, alkaline earth metal fluorohalide phosphors SrFX:Z (where X is at least one halogen selected from the group consisting of Cl, Br and I; and Z is at least one of Eu and Ce.) disclosed in Japanese Patent Application Laid Open No. 2-276997, europium activated complex halide phosphors BaFX xNaX':aEu$^{2+}$ (where each of X or X' is at least one halogen selected from the group consisting of Cl, Br and I; x is greater than 0 and equal to or less than 2; and y is greater than 0 and equal to or less than 0.2.) disclosed in Japanese Patent Application Laid Open No. 59-56479, cerium activated trivalent metal oxyhalide phosphors MOX:xCe (where M is at least one trivalent metal selected from the group consisting of Pr, Nd, Pm, Sm, Eu, Tb, Dy, Ho, Er, Tm, Yb and Bi; X is at least one halogen selected from the group consisting of Br and I; and x is greater than 0 and less than 0.1.) disclosed in Japanese Patent Application Laid Open No. 58-69281, cerium activated rare earth oxyhalide phosphors LnOX:xCe (where Ln is at least one rare earth element selected from the group consisting of Y, La, Gd and Lu; X is at least one halogen selected from the group consisting of Cl, Br, and I; and x is greater than 0 and equal to or less than 0.1.) disclosed in U.S. Pat. No. 4,539,137 and europium activated complex halide phosphors M"FX aM'X'bM'"X"$_2$cM'"X'"$_3$xA:yEu$^{2+}$ (where M" is at least one alkaline earth metal selected from the group consisting of Ba, Sr and Ca; M' is at least one alkaline metal selected from the group consisting of Li, Na, K, Rb and Cs; M'" is at least one divalent metal selected from the group consisting of Be and Mg; M'" is at least one trivalent metal selected from the group consisting of Al, Ga, In and Tl; A is at least one metal oxide; X is at least one halogen selected from the group consisting of Cl, Br and I; each of X', X" and X'" is at least one halogen selected from the group consisting of F, Cl, Br and I; a is equal to or greater than 0 and equal to or less than 2; b is equal to or greater than 0 and equal to or less than $10^{-2}$; c is equal to or greater than 0 and equal to or less than $10^{-2}$; a+b+c is equal to or greater than $10^{-2}$; x is greater than 0 and equal to or less than 0.5; and y is greater than 0 and equal to or less than 0.2.) disclosed in U.S. Pat. No. 4,962,047.

In the present invention, the stimulable phosphor employed for producing a chemiluminescent image may be of any type insofar as it can store the energy of light having a visible light wavelength and can be stimulated by an electromagnetic wave to release the energy of light having a visible light wavelength stored therein in the form of light. However, a stimulable phosphor which can be stimulated by light having a visible light wavelength is preferably employed. More specifically, preferably employed stimulable phosphors include metal halophosphates, rare-earth-activated sulfide-host phosphors, aluminate-host phosphors, silicate-host phosphors and fluoride-host phosphors disclosed in UK Patent Application 2,246,197 A. Among these listed phosphors, rare-earth-activated sulfide-host phosphors are preferable and rare-earth-activated alkaline earth metal sulfide-host phosphors disclosed in U.S. Pat. Nos. 5,029,253 and 4,983,834 are particularly preferable.

The above and other objects and features of the present invention will become apparent from the following description made with reference to the accompanying drawings.

BRIEF DESCRIPTION OF THE DRAWINGS

FIG. 7 shows a CRT screen.

FIG. 9 shows a CRT screen.

DESCRIPTION OF THE PREFERRED EMBODIMENT

Figure 1:
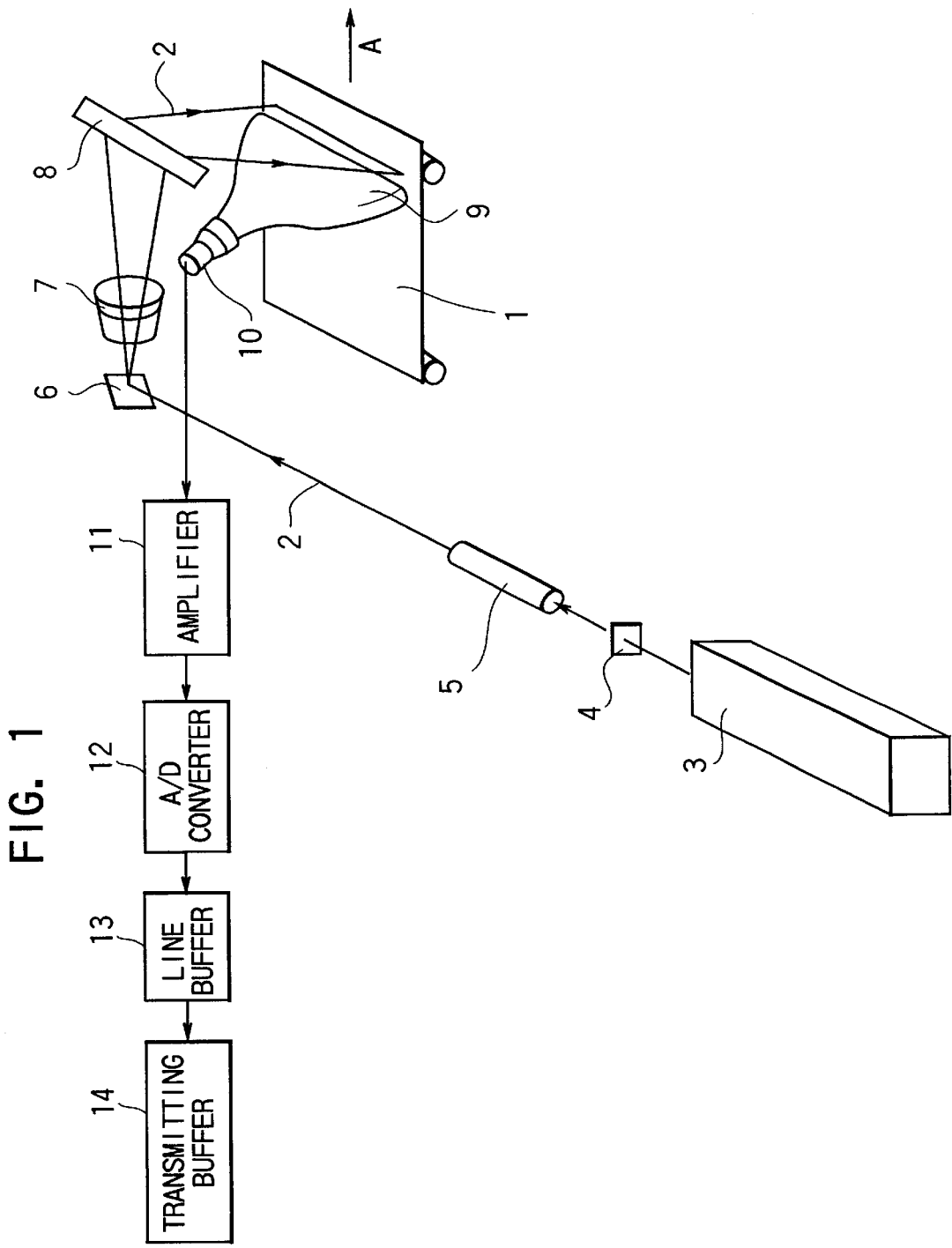
FIG. 1 is a schematic perspective view showing an image reading apparatus for producing image data to be analyzed by an autoradiographic image analyzing apparatus which is an embodiment of the present invention.

In FIG. 1, a stimulable phosphor sheet 1 is formed with a stimulable phosphor layer (not shown) containing a stimulable phosphor and locational information regarding radioactively labeling substance is stored in the form of radiation energy in the stimulable phosphor layer.

In this embodiment, locational information regarding radioactively labeling substance obtained by two-dimensionally distributing protein labeled with a radioactively labeling substance on a TLC plate is recorded in the stimulable phosphor layer.

Locational information as termed here includes a variety of information relating to the location of radioactive labeled substances, or aggregations thereof, present in a specimen, such as the location, the shape, the concentration, the distribution or combinations thereof.

The stimulable phosphor sheet 1 which stores the locational information regarding a radioactively labeling substance in the specimen is scanned with a laser beam 2 and stimulated, thereby being caused to emit stimulated emission.

The laser beam 2 is generated by a laser beam source 3 and passes through a filter 4 to cut off light in the wavelength region corresponding to the wavelength region of stimulated emission to be emitted from the stimulable phosphor sheet 1 in response to stimulation by the laser beam 2. The beam diameter of the laser beam 2 is accurately adjusted by a beam expander 5 and the laser beam 2 enters a beam deflector 6 such as a galvanometer. The laser beam 2 deflected by the beam deflector 6 passes through an fθ lens 7 and is reflected by a plane reflecting mirror 8, thereby one-dimensionally impinging upon the stimulable phosphor sheet 1. The fθ lens 7 ensures that the stimulable phosphor sheet 1 is always scanned with the laser beam 2 at a uniform beam speed.

The stimulable phosphor sheet 1 is conveyed in the direction along the arrow in FIG. 1 in synchronism with the above mentioned scanning with the laser beam 2 so that the whole surface of the stimulable phosphor sheet 1 is scanned by the laser beam 2.

When irradiated with the laser beam 2, the stimulable phosphor sheet 1 releases stimulated emission in an amount proportional to the radiation energy stored therein and the stimulated emission enters a light guiding sheet 9.

The light receiving end of the light guiding sheet 9 has a linear shape and is positioned in the vicinity of the stimulable phosphor sheet 1 so as to face the scanning line on the stimulable phosphor sheet 1. The exit end of the light guiding sheet 9 is in the form of a ring and is connected to the light receiving surface of a light detector 10 such as a photomultiplier for photoelectrically detecting light. This light guiding sheet 9 is made by processing non-fluorescent glass and so constituted that the emission introduced from the light receiving end is transmitted to the exit end under repeated total reflection within the light guiding sheet 9 and received by the light receiving surface of the light detector 10 via the exit end.

Therefore, the stimulated emission produced by the stimulable phosphor sheet 1 upon being irradiated with the laser beam 2 enters into the light guiding sheet 9 and is received by the light detector 10 via the exit end under repeated total reflection within the sheet 9.

On the light receiving surface of the light detector 10 is provided a filter which allows only light of the wavelength region of the stimulated emission released from the stimulable phosphor sheet 1 to pass through and cuts off light of the wavelength region of the laser beam so that the light detector 10 can photoelectrically detect only the stimulated emission released from the stimulable phosphor sheet 1.

The stimulated emission photoelectrically detected by the light detector 10 is converted to an electrical signal, amplified by an amplifier 11 having a predetermined amplifying factor so as to produce an electrical signal of a predetermined level and then input to an A/D converter 12. The electrical signal is converted to a digital signal with a scale factor suitable for the signal fluctuation width and input to a line buffer 13. The line buffer 13 temporarily stores image data corresponding to one scanning line. When the image data corresponding to one scanning line have been stored in the line buffer 13 in the above described manner, the line buffer 13 outputs the data to a transmitting buffer 14 whose capacity is greater than that of the line buffer 13 and when the transmitting buffer 14 has stored a predetermined amount of the image data, it outputs the image data to an autoradiographic image forming apparatus.

Figure 2:
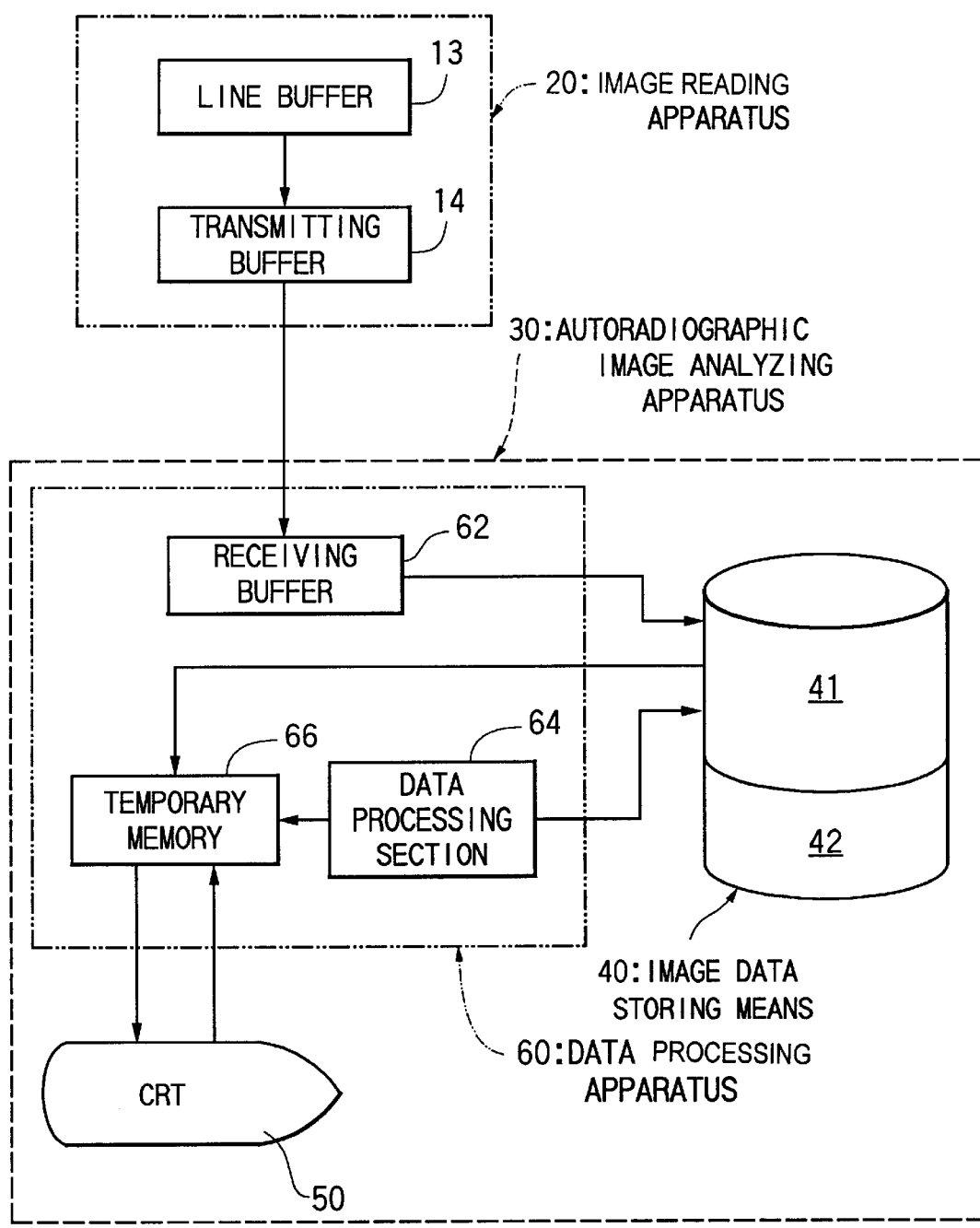
FIG. 2 is a block diagram of an autoradiographic image analyzing apparatus and an image reading apparatus.

FIG. 2 is a block diagram of the autoradiographic image analyzing apparatus and an image reading apparatus.

As shown in FIG. 2, the autoradiographic image analyzing apparatus 30 includes data processing means 60 for receiving image data containing locational information regarding a radioactive labeled substance contained in a specimen, which were stored and recorded in the stimulable phosphor sheet 1, read out by the image reading apparatus 20 and converted to a digital signal, and processing them so as to reproduce a visible image which has desirable density, tone, contrast and the like, and has excellent observation and analysis property, image data storing means 40 for storing image data which were input to the data processing means 60 from the image reading apparatus 20 and processed thereby, and a CRT 50 for reproducing an image based on the image data containing locational information regarding a radioactive labeled substance contained in a specimen.

The image data temporarily stored in the transmitting buffer 14 of the image reading apparatus 20 are input to a receiving buffer 62 in the data processing means 60 of the autoradiographic image analyzing apparatus 30 and temporarily stored therein. When a predetermined amount of the image data have been stored, the stored image data are output to an image data temporary storing section 41 in the image data storing means 40 and stored therein. In this manner, the image data fed from the transmitting buffer 14 of the image reading apparatus 20 to the receiving buffer 62 of the data processing means 60 and temporarily stored therein are fed from the transmitting buffer 14 to the image data temporary storing section 41 in the image data storing means 40. When the image data obtained by scanning the whole surface of the stimulable phosphor sheet 1 with the laser beam 2 have been stored in the image data temporary storing section 41 in the image data storing means 40, the data processing section 64 in the data processing means 60 reads the image data from the image data temporary storing section 41 and stores them in a temporary memory 66 in the data processing means 60. After the image data were subjected to necessary data processing in the data processing section 64, the data processing section 64 stores only the processed image data in an image data storing section 42 in the image data storing means 40. The data processing section 64 then erases the image data stored in the image data temporary storing section 41.

The image data stored in the image data storing section 42 in the image data storing means 40 can be read by the data processing section 64 and displayed on the screen of the CRT 50 so that an operator can view and analyze the image.

Figure 3:
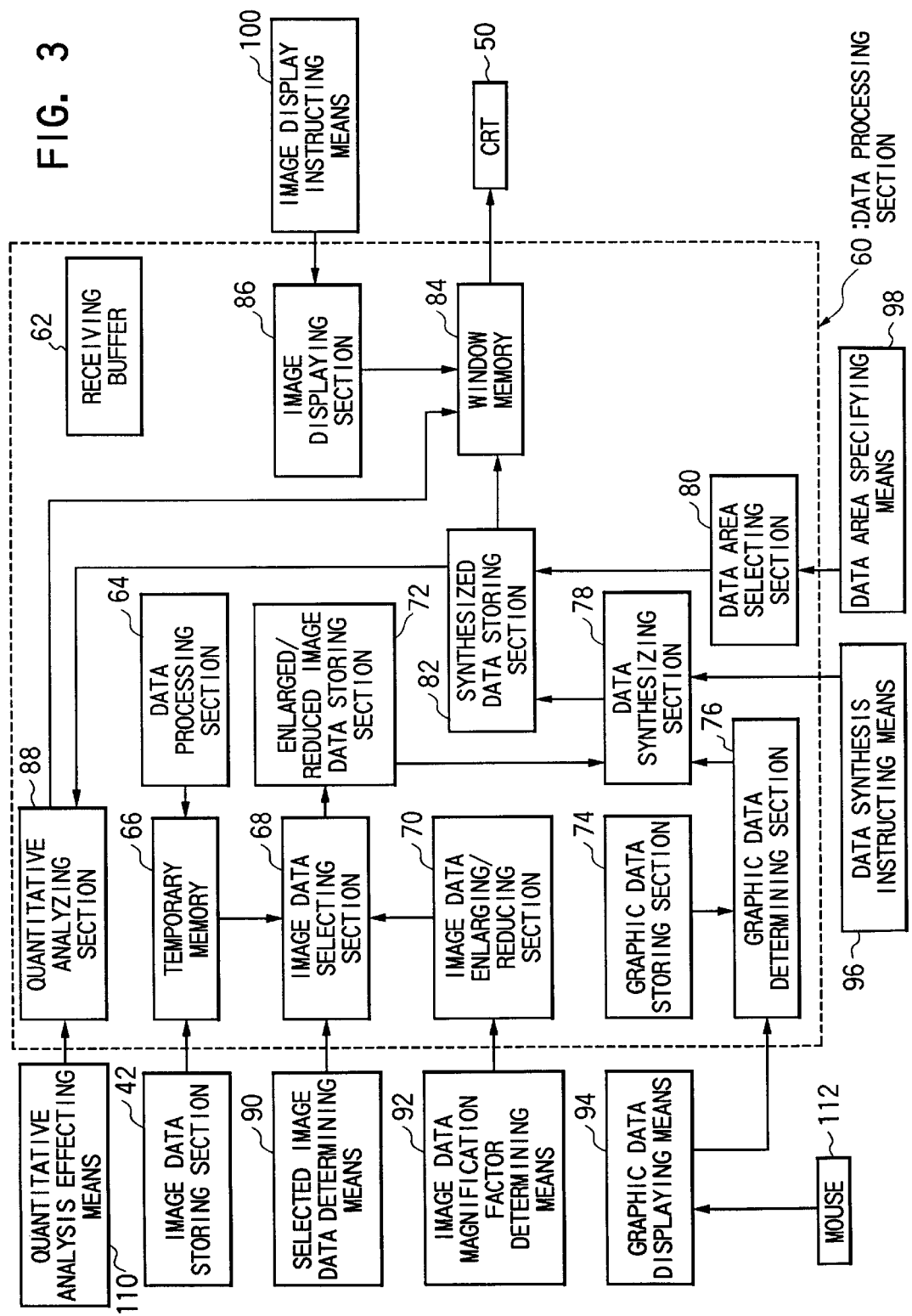
FIG. 3 is a block diagram of data processing means.

FIG. 3 is a block diagram of the data processing means 60. As shown in FIG. 3, the data processing means 60 includes the receiving buffer 62 for receiving image data from the transmitting buffer 14 in the image reading apparatus 20, the data processing section 64 for effecting data processing and the temporary memory 66 for two-dimensionally mapping image data and temporarily storing them.

The data processing means 60 further includes an image data selecting section 68 for selecting a part of the image data from among the image data temporarily stored in the temporary memory 66, an image data enlarging/reducing section 70 for enlarging or reducing the image data selected by the image data selecting section 68, an enlarged/reduced image data storing section 72 for two-dimensionally mapping and temporarily storing the image data enlarged or reduced by the image data enlarging/reducing section 70, a graphic data storing section 74 for storing various graphic data to be displayed on the CRT 50, a graphic data determining section 76 for selecting predetermined graphic data from among the graphic data stored in the graphic data storing section 74 and specifying the position and the size of the graphic data in order to superpose them on the image data two-dimensionally mapped and temporarily stored in the enlarged/reduced image data storing section 72, a data synthesizing section 78 for synthesizing the image data temporarily stored in the enlarged/reduced image data storing section 72 and the graphic data selected and whose position and size have been specified by the graphic data determining section 76, a synthesized image data storing section 82 for two-dimensionally mapping and temporarily storing the image data and the graphic data synthesized by the data synthesizing section 78, a data area selecting section 80 for selecting a predetermined data area from among the image data and the graphic data temporarily stored in the synthesized image data storing section 82, a window memory 84 for two-dimensionally mapping and temporarily storing the data in the data area of the image data and graphic data selected by the data area selecting section 80, an image displaying section 86 for reproducing an image on the screen of the CRT 50 based on the image data and the graphic data two-dimensionally mapped and temporarily stored in the window memory 84, and a quantitative analyzing section 88 for effecting quantitative analysis on a defined region of interest.

An image data selecting signal is input to the image data selecting section 68 from selected image data determining means 90, and an enlarging/reducing signal is input to the image data enlarging/reducing section 70 from image data, magnification factor determining means 92. Further, a graphic data displaying signal is input to the graphic data determining section 76 from graphic data displaying means 94 and a data synthesizing signal is input to the data synthesizing section 78 from data synthesis instructing means 96 which determines what graphic data should be selected and how the image data and the graphic data are to be synthesized to be displayed on the CRT 50. Moreover, a data area specifying signal is input to the data area selecting section 80 from data area specifying means 98 and an image display instructing signal is input to the image displaying section 92 from image display instructing means 100. A quantitative analysis effecting signal is further input to the quantitative analyzing section 88 from quantitative analysis effecting means 110.

In this embodiment, the selected image data determining section 90, the image data magnification factor determining section 92, the graphic data displaying means 94, the data synthesis instructing means 96, the data area specifying means 98, the image display instructing means 100 and the quantitative analysis effecting means 110 can be operated by a mouse 112. In FIG. 3, the mouse 112 is connected to only the graphic data displaying means 94 for simplification.

The thus constituted image analyzing apparatus defines a region of interest in an image displayed on the screen of the CRT 50 based on image data and graphic data stored in the image data storing means 40. in the following manner.

First, image data stored in the image data storing section 42 are two-dimensionally mapped and temporarily stored in the temporary memory 66. When the selected image data determining means 90 is operated, a part of the image data two-dimensionally mapped and stored in the temporary memory 66 are selected and two-dimensionally mapped and temporarily stored in the image data selecting section 68. The image data two-dimensionally mapped and stored in the image data selecting section 68 are then two-dimensionally mapped and stored in the enlarged/reduced image data storing section 72 without being enlarged or reduced and two-dimensionally mapped and stored in the synthesized image data storing section 82 without being synthesized with any graphic data. The image data two-dimensionally mapped and stored in the synthesized image data storing section 82 are two-dimensionally mapped and stored in the window memory 84 and an image is displayed on the screen of the CRT 50 based on the image data by operating the image display instructing means 100.

The operator views the image displayed on the screen of the CRT 50 and, as occasion demands, operates the image data magnification factor determining means 92, thereby enlarging or reducing the image data two-dimensionally mapped and stored in the image data selecting section 68 and two-dimensionally mapping and storing the image data in the enlarged/reduced image data storing section 72. The image data two-dimensionally mapped and stored in the enlarged/reduced image data storing section 72 are then read out by the data synthesizing section 78 to be two-dimensionally mapped and stored in the synthesized image data storing section 82. When the operator specifies a part of region of the image data two-dimensionally mapped and stored in the synthesized image data storing section 82 by operating the data area specifying means 98, the thus specified image data are forwarded into the window memory 84 and two-dimensionally mapped and stored therein. When the image display instructing means 100 is operated, an image is displayed on the screen of the CRT 50 by the image displaying section 86.

Figure 4:
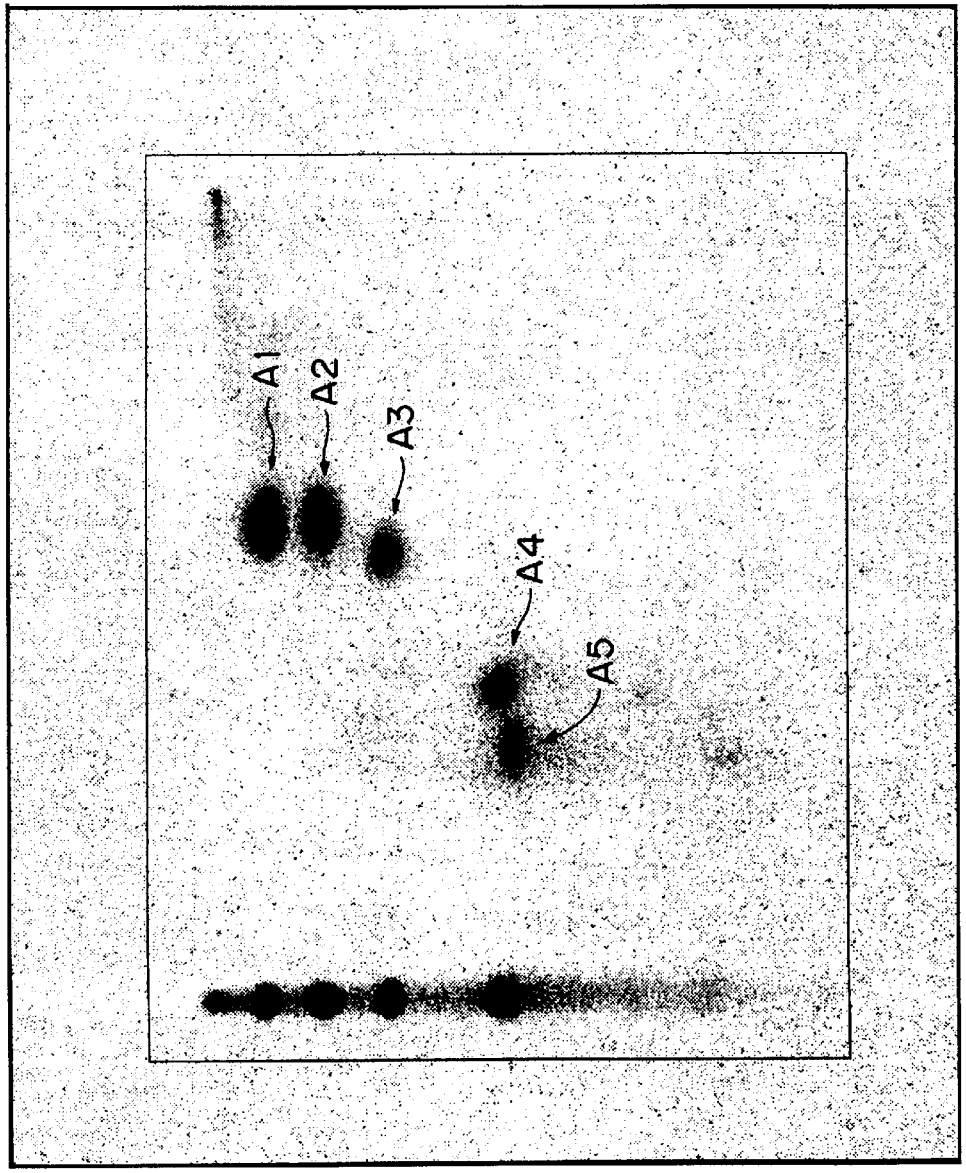
FIG. 4 shows a CRT screen displaying an autoradiographic image obtained by two-dimensionally distributing protein labeled with a radioactively labeling substance on a TLC plate.

FIG. 4 shows the screen of a CRT 50 on which an autoradiographic image of a radioactively labeling substance obtained by two-dimensionally distributing protein labeled with the radioactively labeling substance on a TLC plate is displayed.

As shown in FIG. 4, the autoradiographic image of a radioactively labeling substance obtained by two-dimensionally distributing protein labeled with the radioactively labeling substance on the TLC plate includes a plurality of spot image regions A1, A2, A3, A4, A5 two-dimensionally distributed. In the autoradiographic detecting process, it is often required to define the spot image regions A1, A2, A3, A4, A5 as regions of interest using figures to produce the sum value of density in each region for image analysis.

When a region of interest is defined, the operator manipulates the mouse 112 to draw a figure used for defining the spot image region A1 whose density is to be obtained on the screen of the CRT 50 and select it.

When the operator uses the mouse 112 to operate the data synthesis instructing means 96, thereby entering an instruction to synthesize the image data and graphic data and manipulates the mouse 112 to operate the graphic data displaying means 94, a graphic data displaying signal including positional information in accordance with the manipulation of the mouse 112 is input to the graphic data determining section 76 so that the graphic data determining section 76 reads out graphic data corresponding to the positional information from the graphic data storing section 74 to the data synthesizing section 78. The graphic data are synthesized with image data two-dimensionally mapped and stored in the enlarged/reduced image data storing section 72. The thus synthesized image data and graphic data are two-dimensionally mapped and stored in the synthesized image data storing section 82 and forwarded to the window memory 84 so that a figure is displayed on the image displayed on the screen of the CRT 50 based on the graphic data. As a result, the spot image region A1 is defined as a region of interest by the figure in the image displayed on the screen of the CRT 50 based on the image data. Coordinate values of the image data two-dimensionally mapped and stored in the synthesized image data storing section 82 and corresponding to the spot image region A1 and coordinate values of the graphic data corresponding to the figure defining the spot image region A1 as a region of interest are input to the quantitative analyzing section 88.

Similarly, the respective spot image regions A2, A3, A4, A5 are defined as regions of interest by figures and coordinate values of the image data two-dimensionally mapped and stored in the synthesized image data storing section 82 and corresponding to the spot image regions A2, A3, A4, A5 and coordinate values of the graphic data corresponding to the figures defining the spot image regions A2, A3, A4, A5 as regions of interest are input to the quantitative analyzing section 88.

Figure 5:
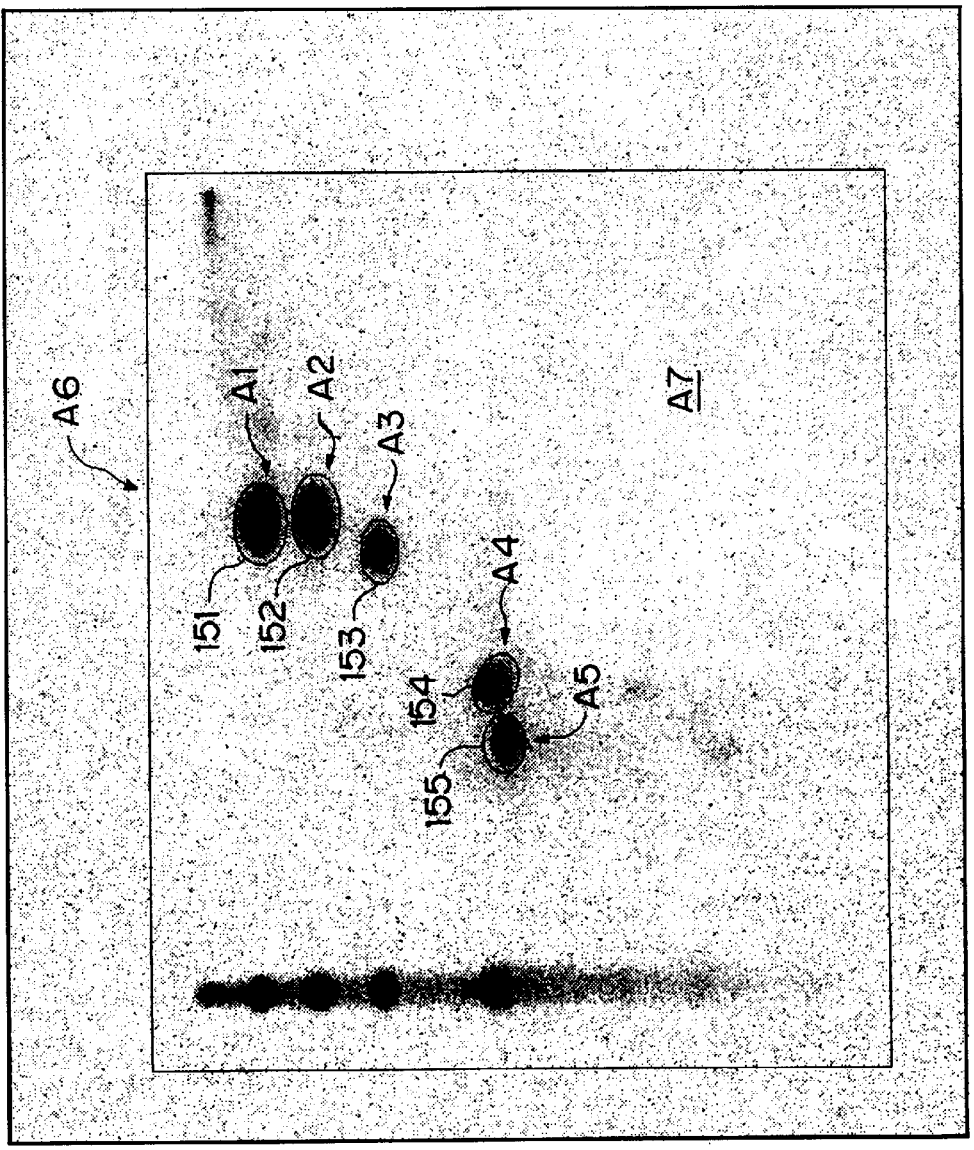
FIG. 5 shows a CRT screen displaying a plurality of spot image regions defined as regions of interest in an autoradiographic image.

FIG. 5 shows the screen of the CRT 50 on which all spot image regions A1, A2, A3, A4, A5 are defined as regions of interest by FIGS. 151, 152, 153, 154, 155 in this manner.

When the quantitative analysis effecting means 110 is operated after all spot image regions A1, A2, A3, A4, A5 have been defined as regions of interest by FIGS. 151, 152, 153, 154, 155, the quantitative analyzing section 88 can analyze the image data corresponding to the spot image regions A1, A2, A3, A4, A5 and obtain the sum values of density of the respective spot image regions. However, an image region A7 existing aside from the spot image regions A1, A2, A3, A4, A5 in the whole image region A6 displayed on the screen of the CRT 50 cannot be defined as a region of interest by a single figure, despite that it may well include locational information regarding a radioactively labeling substance. Because of this, even if the quantitative analysis effecting means 110 is operated, the sum value of density in the image region A7 cannot be obtained. Therefore, in a conventional image analyzing apparatus, the quantitative analysis effecting means 110 is operated to cause the quantitative analyzing section 88 to obtain the sum values of density in the spot image regions A1, A2, A3, A4, A5 defined as regions of interest and the whole image region A6 and the operator has to manually calculate the sum value of density in the image region A7 by subtracting the sum value of density in the spot image regions A1, A2, A3, A4, A5 from that in the whole image region A6. This is extremely troublesome.

In view of the above, the image analyzing apparatus according to this embodiment is constituted so as to be able to easily obtain the sum value of density in the image region A7 aside from the spot image regions A1, A2, A3, A4, A5 in the whole image region A6 displayed on the screen of the CRT 50.

Figure 6:
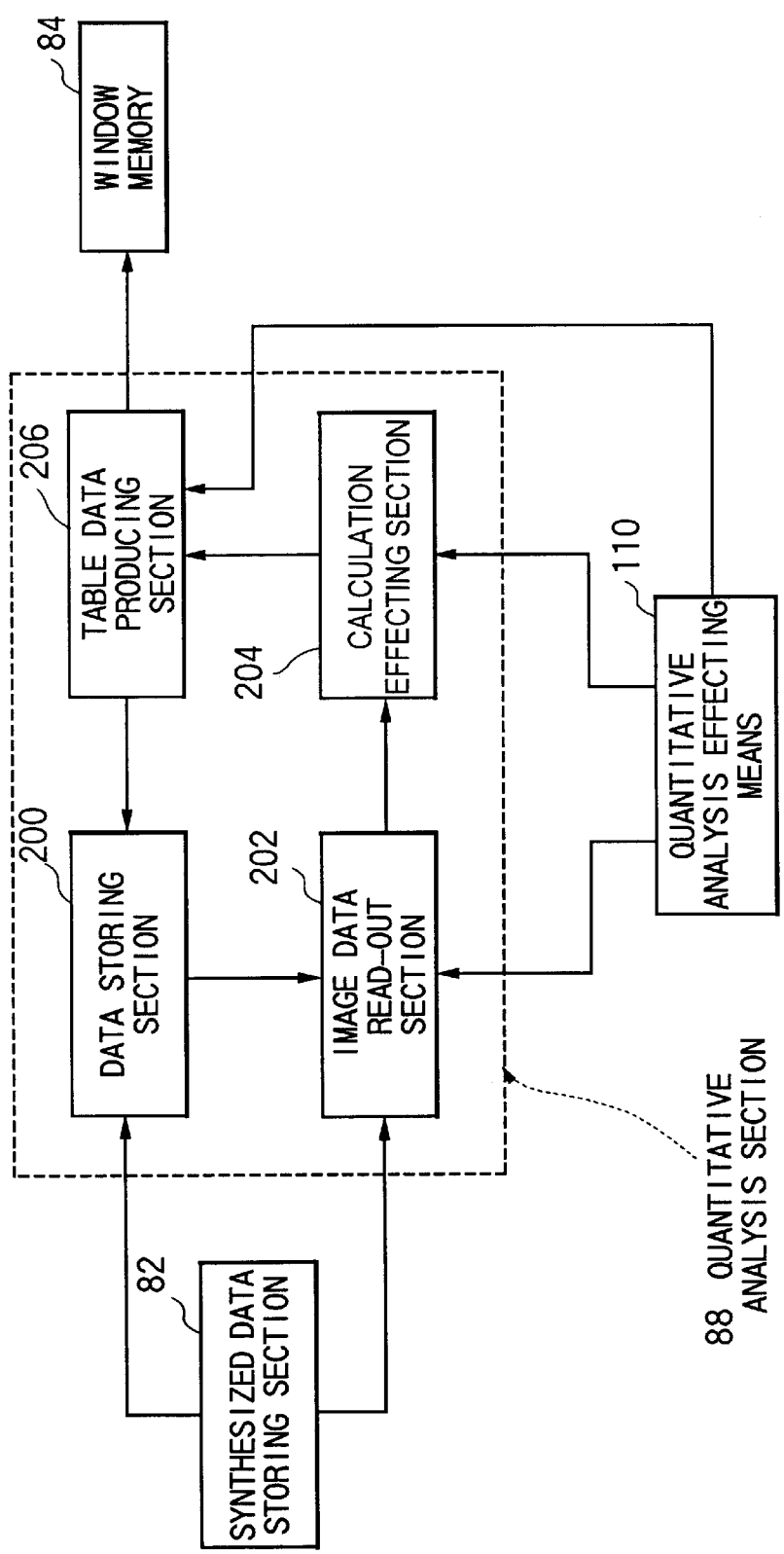
FIG. 6 is a block diagram of a quantitative analyzing section.

FIG. 6 is a block diagram of the quantitative analyzing section 88.

As shown in FIG. 6, the quantitative analyzing section 88 includes a data storing section 200 for storing coordinate values of image data input from the synthesized image data storing section 82 and corresponding to the respective regions of interest, coordinate values of graphic data corresponding to figures defining the respective regions of interest and coordinate values of image data corresponding to the whole image region A6, an image data read-out section 202 for reading out image data two-dimensionally mapped and stored in the synthesized image data storing section 82 in accordance with the coordinate values stored in the data storing section 200, a calculation processing section 204 for effecting calculation on image data input from the image data read-out section 202 in accordance with a quantitative analysis effecting signal input from the quantitative analysis effecting means 110, and a table data producing section 206 for producing table data based on the results of calculation effected on the image data and input from the calculation processing section 204 and outputting them to the window memory 84.

When the operator inputs an instruction signal requesting calculation of the sum values of density in the regions of interest to the quantitative analysis effecting means 110, a quantitative analysis effecting signal is input to the image data read-out section 202. In accordance with the quantitative analysis effecting signal input from the quantitative analysis effecting means 110, the image data read-out section 202 reads out the coordinate values of the image data corresponding to the respective regions of interest A1, A2, A3, A4, A5 and the graphic data corresponding to the figures defining the respective regions of interest A1, A2, A3, A4, A5 from the data storing section 200 and simultaneously reads out the image data corresponding to the whole image region A6 and the coordinate values thereof from the synthesized image data storing section 82, thereby outputting them to the calculation processing section 204. In accordance with the quantitative analysis effecting signal input from the quantitative analysis effecting means 110, the calculation processing section 204 calculates area values of the respective regions of interest A1, A2, A3, A4, A5 and the whole image region A6 based on the coordinate values input from the image data read-out section 202 and also calculates the sum values of density in the respective regions of interest A1, A2, A3, A4, A5 and the whole image region A6, thereby outputting them to the table data producing section 206. The table data producing section 206 produces table data based on the results of calculation input from the calculation processing section 204 and outputs them to the window memory 84. As a result, the area values of the respective regions of interest A1, A2, A3, A4, A5 and the whole image region A6 and the sum values of density in the respective regions of interest A1, A2, A3, A4, A5 and the whole image region A6 are displayed on the screen of the CRT 50 in the form of a table.

FIG. 7 shows a "Result Table" produced in this manner and displayed on the screen of the CRT 50. As shown in FIG. 7, the "Result Table" includes the area values of the respective regions of interest A1, A2, A3, A4, A5 and the whole image region A6 and the sum values of density in the respective regions of interest A1, A2, A3, A4, A5 and the whole image region A6.

Figure 8:
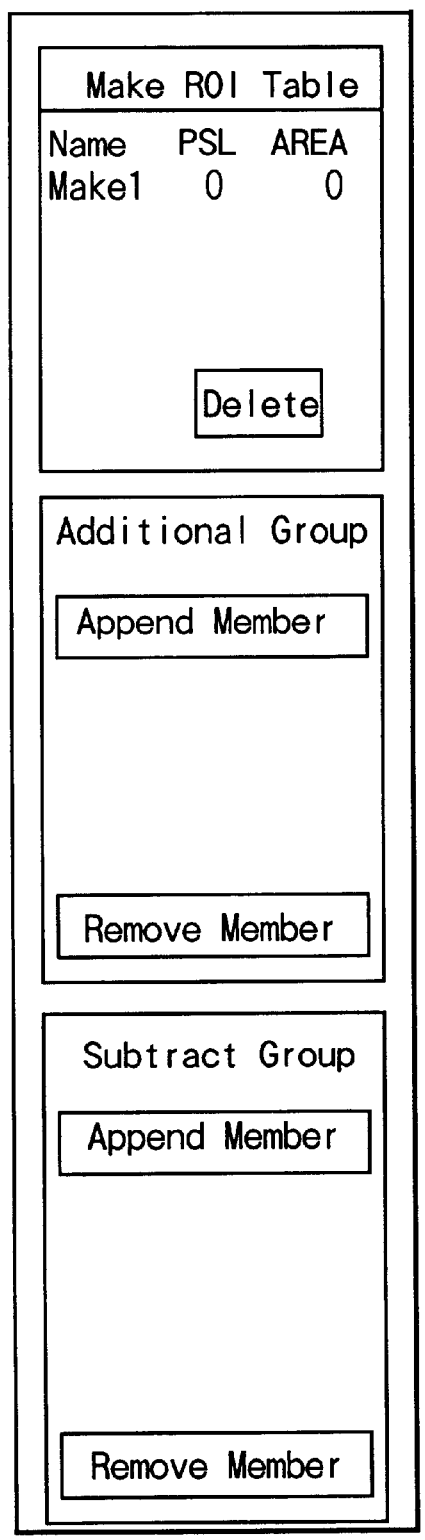
FIG. 8 shows a CRT screen.

In the case where the area value of the image region A7 aside from the image regions A1, A2, A3, A4, A5 in the whole image region A6 displayed on the screen of the CRT 50 and the sum value of density in the image region A7 are to be calculated, the operator uses the mouse 112 to click on "New" in a "Make ROI" button in the "Result Table". As a result, an instruction signal requesting production of data regarding a new region of interest is input from the quantitative analysis effecting means 110 to the calculation processing section 204 and the table data producing section 206 and, as shown in FIG. 8, a "Make ROI Table" including a line in which the name of the region of interest for which data are to be newly produced is indicated as "Make1" is displayed on the screen of the CRT 50. Although data corresponding to the image region A7 are to be assigned to the "Make1", no data has been assigned at this stage.

When the area value of the image region A7 aside from the image regions A1, A2, A3, A4, A5 in the whole image region A6 displayed on the screen of the CRT 50 and the sum value of density in the image region A7 are to be calculated by subtracting the area values of the respective image regions A1, A2, A3, A4, A5 and the sum values of density in the respective image regions A1, A2, A3, A4, A5 from the area value of the whole image region A6 and the sum value of density of the whole image region A6, the operator further uses the mouse 112 to select the image region A6 from the "Result Table" and to then click on an "Appended Member" button of an "Additional Group" displayed on the screen of the CRT 50 together with the "Make ROI Table," as shown in FIG. 8. As a result, image data and coordinate values corresponding to the image region A6 selected from the "Result Table" are read out from the synthesized image data storing section 82 by the image data read-out section 202 to the calculation effecting section 204 and further output to the table data producing section 206, whereby the area value of the image region A6 and the sum value of density in the image region A6 are copied and registered in the "Additional Group".

Afterwards, when the operator uses the mouse 112 to select the image regions A1, A2, A3, A4, A5 whose area values and sum values of density are to be subtracted from the area value of the image region A6 and the sum value of density in the image region A6 from the "Result Table" and to click on an "Appended Member" button of a "Subtract Group" displayed on the screen of the CRT 50 together with the "Make ROI Table" and the "Additional Group" as shown in FIG. 8, the coordinate values of the image data corresponding to the image regions A1, A2, A3, A4, A5 and the graphic data corresponding to the figures defining the image regions A1, A2, A3, A4, A5 are read out from the data storing section 200 to the calculation effecting section 204 by the image data read-out section 202 and further output to the table data producing section 206, whereby the area value of the image regions A1, A2, A3, A4, A5 and the sum values of density in the image regions A1, A2, A3, A4, A5 are copied and registered in the "Subtract Group".

The calculation effecting section 204 further subtracts the area values of the image regions A1, A2, A3, A4, A5 and the sum values of density in the image regions A1, A2, A3, A4, A5 registered in the "Subtract Group" from the area value of the image region A6 and the sum value of density in the image region A6 registered in the "Additional Group" based on the image data and the coordinate values corresponding to the whole image region A6, the image data corresponding to the image regions A1, A2, A3, A4, A5 and the graphic data corresponding to the figures defining the image regions A1, A2, A3, A4, A5 and outputs the thus obtained results of calculation to the table data producing section 206. As a result, the table data producing section 206 assigns the area value of the image region A7 aside from the image regions A1, A2, A3, A4, A5 in the image A6 and the sum value of density of the image region A7 to "Make1" in the "Make ROI Table".

Afterwards, when the operator uses the mouse 112 to select "Make1" in the "Make ROI Table" and to click on the "Appended Member" button in a "Group Table" displayed on the screen of the CRT 50 together with the "Result Table", the "Make ROI Table," the "Additional Group" and the "Subtract Group," data in the "Make1" to which the area value of the image region A7 aside from the image regions A1, A2, A3, A4, A5 in the image A6 and the sum value of density of the image region A7 are assigned are output to the data storing section 200 and the fact that quantitative data of the region of interest A7 have been obtained by subtracting the quantitative data of the image regions A1, A2, A3, A4, A5 from the quantitative data of the whole image region A6 are stored therein as data of the region of interest A7 together with the area value of the image region A7 and the sum value of density in the image region A7. At the same time, "Make1" is registered in the "Group Table" as quantitative data of the region of interest A7.

FIG. 9 shows the screen of the CRT 50 after "Make1" to which the area value of the image region A7 aside from the image regions A1, A2, A3, A4, A5 in the image A6 and the sum value of density of the image region A7 are assigned was registered in the "Group Table" as interest region quantitative data of the region of interest A7.

According to the above described embodiment, even if an image region which is extremely hard to be defined as a region of interest in an image such as an image region A7 existing aside from the spot image regions A1, A2, A3, A4, A5 in the whole image region A6 is not defined as a region of interest in an image, the area value of the image region A7 aside from the image regions A1, A2, A3, A4, A5 in the image A6 and the sum value of density of the image region A7 can be quantitatively analyzed only by adding and subtracting quantitative data obtained based on image data corresponding to regions of interest. Therefore, it is possible to save quantitative data of the image region A7 by an extremely simple method, as if the image region A7 is defined as a region of interest.

The present invention has thus been shown and described with reference to a specific embodiment. However, it should be noted that the present invention is in no way limited to the details of the described arrangements but changes and modifications may be made without departing from the scope of the appended claims.

For example, in the above described embodiment, the explanation is made as to two-dimensionally distributing protein labeled with a radioactively labeling substance on a TLC plate, storing locational information regarding the radioactively labeling substance in the stimulable phosphor sheet 1, photoelectrically reading out the stored locational information, effecting predetermined data processing thereon, displaying an autoradiographic image including a plurality of spot image regions A1, A2, A3, A4, A5 on the screen of the CRT 50 and effecting quantitative analysis on the image region A7 excluding the spot image regions A1, A2, A3, A4, A5 from the whole image region A6. However, the present invention is not limited to the analysis of such an autoradiographic image and can also be applied for effecting quantitatively analysis on autoradiographic images for studying a genetic sequence, the expression level of a gene and the metabolism, absorption, excretion path and state of a substance in which a single organ of a test mouse is divided to a plurality of spaced image regions since the test mouse is sliced when a predetermined time period has passed after a drug labeled with a radioactively labeling substance was introduced thereinto and an autoradiographic image is produced using a stimulable phosphor sheet 1 so as to cause the calculation effecting section 204 to add the area values of these spaced image regions and the sum values of density in these image regions and quantitatively analyzing these image regions as a single region of interest, and effecting quantitatively analysis on an autoradiographic image region including image regions which are not required to be quantitatively analyzed therein such as those of a cerebrum, the heart of a test mouse so as to cause the calculation effecting section 204 to subtract the area values of the image regions included therein and the sum value of density in the image regions from the area value of the whole image region and the sum value of density in the whole image region. Further, the present invention is not limited to the analysis of such autoradiographic images and is also applicable to analysis of other autoradiographic images produced using the stimulable phosphor sheet 1 such as an autoradiographic image of a gene electrophoresed by the Southern blot hybridization method, an autoradiographic image produced by polyacrylamide gel electrophoresis for the separation or identification of a protein or the estimation of the molecular weight or properties of a protein or the like. Moreover, the present invention can be applied to analyze chemiluminescent images produced by a chemiluminescent process such as a chemiluminescent image of a gene produced by the Southern blot hybridization method, a chemiluminescent image of a protein produced by thin layer chromatography, a chemiluminescent image produced by polyacrylamide gel electrophoresis for the separation or identification of a protein or the estimation of the molecular weight or properties of a protein or the like. Further, the present invention can be widely applied for analyzing an electron beam transmission image, an electron beam diffraction image of a metal or nonmetal produced by an electron microscope, an electron beam image of tissue of an organism and a radiographic diffraction image of a metal or nonmetal, or images of fluorescent substances recorded in a gel support or a transfer support or images of fluorescent substances for the separation or identification of a protein or the estimation of the molecular weight or properties of a protein including an image region therein, which cannot be defined by a single figure but is required to be quantitatively analyzed.

Furthermore, in the above described embodiment, although the light guide 9 made by processing a non-fluorescent glass or the like is employed, the light guide 9 is not limited to one made of a non-fluorescent glass but a light guide made by processing synthesized crystal, a transparent sheet such as an acrylic synthetic resin sheet or the like may be used.

Further, in the above described embodiment, although the image data are produced by using the stimulable phosphor sheet 1 and converting locational information regarding a radioactive labeled substance to an electrical signal and are displayed on the CRT 50 as a visible image, it is possible to once form a visible image on a photographic film instead of the stimulable phosphor sheet 1, photoelectrically read the visible image, convert it to an electrical signal and process the thus obtained image data in a similar manner to the above.

Furthermore, in the present invention, the respective means need not necessarily be physical means and arrangements whereby the functions of the respective means are accomplished by software fall within the scope of the present invention. In addition, the function of a single means may be accomplished by two or more physical means and the functions of two or more means may be accomplished by a single physical means.

According to the present invention, it is possible to provide an image analyzing apparatus capable of defining an image region which cannot be defined by a single figure in an image reproduced based on image data as a region of interest and effecting quantitative analysis thereon.

What is claimed is:

1. An image analyzing apparatus comprising:
   an image data storing means for storing image data;
   a graphic data storing means for storing graphic data;
   a synthesized image data storing means for synthesizing data of said image data storing means and said graphic data storing means;
   a display means for displaying an image based on synthesized image data stored in the synthesized image data storing means,
   said synthesized image data storing means being operable to store a plurality of regions of interest in the image data using graphic data stored in the graphic data storing means; and
   a calculation effecting means for producing quantitative data based on image data corresponding to the plurality of regions of interest, for adding and/or subtracting the thus produced quantitative data corresponding to the plurality of regions of interest for display of the results of the adding and/or subtracting calculation on the display means.

2. An image analyzing apparatus in accordance with claim 1 which further comprises an interest region quantitative data storing means for storing the quantitative data of the regions of interest obtained by the addition and/or subtraction effected by the calculation effecting means and data regarding how the quantitative data of the regions of interest were obtained as interest region data.

3. An image analyzing apparatus in accordance with claim 2 which further comprises a table data producing means for producing table data based on the results of calculation effected by the calculation effecting means and displaying at least one table on the display means.

4. An image analyzing apparatus in accordance with claim 2 wherein the image data stored in said image data storing means are produced from a stimulable phosphor sheet formed with a stimulable layer containing a stimulable phosphor.

5. An image analyzing apparatus in accordance with claim 3 wherein the image data stored in said image data storing means from a stimulable phosphor sheet formed with a stimulable layer containing a stimulable phosphor.

6. An image analyzing apparatus in accordance with claim 2 wherein the image data stored in said image data storing means are produced from image data selected from a group consisting of radiation image data of an object, autoradiographic image data, radiographic diffraction image data, electron microscopic image data, chemiluminescent image data and fluorescent image data produced by a fluorescent detecting system.

7. An image analyzing apparatus in accordance with claim 3 wherein the image data stored in said image data storing means are produced from image data selected from a group consisting of radiation image data of an object, autoradiographic image data, radiographic diffraction image data, electron microscopic image data, chemiluminescent image data and fluorescent image data produced by a fluorescent detecting system.

8. An image analyzing apparatus in accordance with claim 4 wherein the image data stored in said image data storing means are produced from image data selected from a group consisting of radiation image data of an object, autoradiographic image data, radiographic diffraction image data, electron microscopic image data, chemiluminescent image data and fluorescent image data produced by a fluorescent detecting system.

9. An image analyzing apparatus in accordance with claim 5 wherein the image data stored in said image data storing means are produced from image data selected from a group consisting of radiation image data of an object, autoradiographic image data, radiographic diffraction image data, electron microscopic image data, chemiluminescent image data and fluorescent image data produced by a fluorescent detecting system.

10. The image analyzer of claim 2, wherein the calculation effecting means provides at least one of a sum and a difference of the quantitative data corresponding to the plurality of regions of interest, and wherein the interest region quantitative data storing means tracks how quantitative data of the regions of interest were obtained by listing added regions and subtracted regions independently.

11. The image analyzer of claim 10, wherein the quantitative data comprises an image density value.

12. An image analyzing apparatus in accordance with claim 1 which further comprises a table data producing means for producing table data based on the results of calculation effected by the calculation effecting means and displaying at least one table on the display means.

13. An image analyzing apparatus in accordance with claim 12 wherein the image data stored in said image data storing means are produced from a stimulable phosphor sheet formed with a stimulable layer containing a stimulable phosphor.

14. An image analyzing apparatus in accordance with claim 13 wherein the image data stored in said image data storing means are produced from image data selected from a group consisting of radiation image data of an object, autoradiographic image data, radiographic diffraction image data, electron microscopic image data, chemiluminescent image data and fluorescent image data produced by a fluorescent detecting system.

15. An image analyzing apparatus in accordance with claim 12 wherein the image data stored in said image data storing means are produced from image data selected from a group consisting of radiation image data of an object, autoradiographic image data, radiographic diffraction image data, electron microscopic image data, chemiluminescent image data and fluorescent image data produced by a fluorescent detecting system.

16. An image analyzing apparatus in accordance with claim 1 wherein the image data stored in said image data storing means are produced from a stimulable phosphor sheet formed with a stimulable layer containing a stimulable phosphor.

17. An image analyzing apparatus in accordance with claim 16 wherein the image data stored in said image data storing means are produced from image data selected from a group consisting of radiation image data of an object, autoradiographic image data, radiographic diffraction image data, electron microscopic image data, chemiluminescent image data and fluorescent image data produced by a fluorescent detecting system.

18. An image analyzing apparatus in accordance with claim 1 wherein the image data stored in said image data storing means are produced from image data selected from a group consisting of radiation image data of an object, autoradiographic image data, radiographic diffraction image data, electron microscopic image data, chemiluminescent image data and fluorescent image data produced by a fluorescent detecting system.

19. The image analyzing apparatus of claim 1, wherein the calculation effecting means provides at least one of a sum and a difference of the quantitative data correspoding to the plurality of regions of interest.

20. The image analyzer of claim 19, wherein the quantitative data comprises an image density value.

* * * * *